(12) United States Patent
Weiner et al.

(10) Patent No.: US 12,229,324 B2
(45) Date of Patent: Feb. 18, 2025

(54) SECURITY MEASURES FOR SIGNAL PATHS WITH TREE STRUCTURES

(71) Applicant: Arm Limited, Cambridge (GB)

(72) Inventors: Michael Weiner, Ness-Ziona (IL); Robert John Harrison, Sheffield (GB); Oded Golombek, Even Yehuda (IL); Yoav Asher Levy, Kfar-Saba (IL)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 18/371,045

(22) Filed: Sep. 21, 2023

(65) Prior Publication Data

US 2024/0012946 A1   Jan. 11, 2024

Related U.S. Application Data

(62) Division of application No. 16/722,459, filed on Dec. 20, 2019, now Pat. No. 11,797,714.

(51) Int. Cl.
| | |
|---|---|
| *G06F 21/75* | (2013.01) |
| *G06F 9/54* | (2006.01) |
| *G06F 21/78* | (2013.01) |
| *G06F 30/327* | (2020.01) |
| *G06F 30/347* | (2020.01) |
| *G06F 30/396* | (2020.01) |

(52) U.S. Cl.
CPC ............ *G06F 21/755* (2017.08); *G06F 9/542* (2013.01); *G06F 21/78* (2013.01); *G06F 30/327* (2020.01); *G06F 30/347* (2020.01); *G06F 30/396* (2020.01)

(58) Field of Classification Search
USPC ........................................................ 716/136
See application file for complete search history.

(56) References Cited

U.S. PATENT DOCUMENTS

| | | | | |
|---|---|---|---|---|
| 2020/0034572 A1* | 1/2020 | Mundra | .................. | G06F 21/85 |
| 2021/0026994 A1* | 1/2021 | Tehranipoor | .......... | G06F 30/343 |

OTHER PUBLICATIONS

Non-Final Office Action issued in U.S. Appl. No. 16/722,459, mailed Mar. 29, 2023, 5 pages.

* cited by examiner

*Primary Examiner* — Bryce M Aisaka
(74) *Attorney, Agent, or Firm* — Talem IP Law, LLP

(57) ABSTRACT

Security measures for signal paths with tree structures can be implemented at design phase using an EDA software program or tool with security feature functionality that, when executed by a computing system, directs the computing system to: display a canvas through which components of a circuit are arranged; and provide a menu of commands, including an option to add components from a library to the canvas and an option to secure a tree. In response to receiving a selection of the option to secure the tree, the system can be directed to add a hardware countermeasure coupled to at least two lines or terminal nodes of a tree structure identified from components on the canvas or in a netlist corresponding to a circuit's design.

9 Claims, 9 Drawing Sheets

SECURITY MEASURES FOR SIGNAL PATHS WITH TREE STRUCTURES

CROSS-REFERENCE TO RELATED APPLICATION

This Application is a Divisional Application of U.S. Ser. No. 16/722,459, filed Dec. 20, 2019.

BACKGROUND

Tampering, or manipulating and probing, of an electronic system can expose confidential information or modify authentic and trusted data. An example of such sensitive information can be secret key information used in cryptography engine implementations, such as AES (Advanced Encryption Standard). Fault attacks can be performed on a reset distribution network (i.e., a 'reset tree') to manipulate particular sections of the reset tree. In many cases, this is difficult to detect, and consequences of manipulation can be costly. In certain cases, where a security-critical register is affected, the security mechanisms can be disabled, causing the system to be compromised.

BRIEF SUMMARY

Security measures for signal paths with tree structures are provided. The described security measures can secure a tree against a fault attack using minimal overhead. An Electronic Design Automation (EDA) program or tool can automatically insert the described security measures in a design for use on chip.

An EDA software program or tool with security feature functionality, when executed by a computing system, can direct the computing system to: display a canvas through which components of a circuit are arranged; and provide a menu of commands, including an option to add components from a library to the canvas, options for analysis tools, and an option to secure a tree. The EDA software program or tool can also provide various options for manipulation of components on the canvas. In response to receiving a selection of the option to secure the tree, the system can be directed to add a hardware countermeasure coupled to at least two lines or terminal nodes of a tree structure identified from components on the canvas or in a netlist corresponding to a circuit's design. The hardware countermeasure is configured to detect differences of a signal at the least two lines or terminal nodes and output an alarm when the differences satisfy an error condition. In some cases, each terminal node of the tree structure is coupled to the hardware countermeasure.

A chip with a circuit having security measures for signal paths with tree structures can include: one or more tree structures; a detector coupled to two or more nodes of a single tree structure of the one or more tree structures to detect differences between values of a signal at the two or more nodes; and an alarm circuit coupled to receive an output of the detector and initiate an alarm in response to a detection signal indicating that differences between the values of the signal at the two or more nodes satisfy an error condition.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Security measures for signal paths with tree structures are provided. The described security measures can secure a tree against a fault attack using minimal overhead. An EDA program or tool can automatically insert the described security measures in a design for use on chip.

A design process for electronic circuits includes a step for placement of circuit elements and routing of wires and interconnections. This can be carried out at the chip level—for integrated circuits or a field programmable gate array—or at a circuit board level—for printed circuit boards or other circuit packages. EDA tools, such as available through Cadence Design Systems, Inc. and Synopsys, Inc., are used during the place and route stage to optimize arrangements and enable increased complexity in design (as compared to manual layout) as well as automated placement of certain components and interconnections, including in the form of tree structures.

A system or circuit often requires a signal to be consistent across multiple places in the system or circuit. For example, a clock or reset signal may be propagated throughout a design and be required to be consistent throughout to maintain timing or operation across multiple components. The distribution of a signal that is used for timing or operation can create a vulnerability to an attack that changes a value in a terminal branch of the signal distribution because the change may create a circuit that becomes nonfunctional or resets. If a reset occurs, hardware in the system or circuit could, by default, boot into an unsecure state, which can allow an attack to be leveraged further.

For example, a reset tree is a distribution network that connects the root (e.g., the reset port) to the leaves (e.g., with terminal nodes that are typically registers for capturing a signal for a logic computation) through a variety of buffers in such a way that very few leaves share a route back to the root port. Within this architecture, neighboring leaves may have reset paths that pass through different number of buffers and belong to different sections of the tree. An advantage of this architecture is that the tree structure provides high flexibility for physical implementation (e.g., cell placement) along with good performance characteristics such as latency, skew, and noise-immunity. A number of EDA tools may be used to generate such distribution schemes.

Figure 1A:
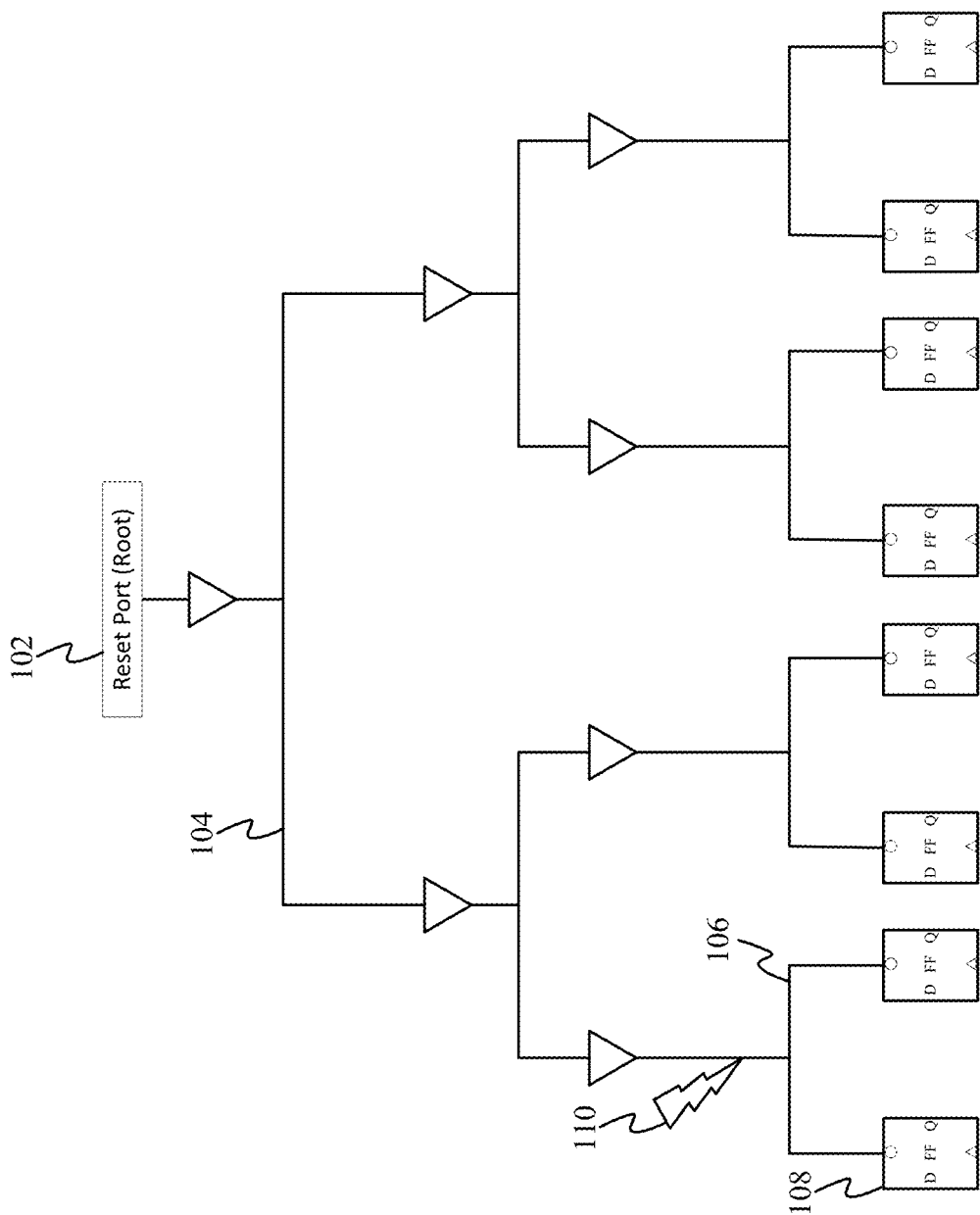
FIG. 1A illustrates an example reset tree distribution network.
Figure 1B:
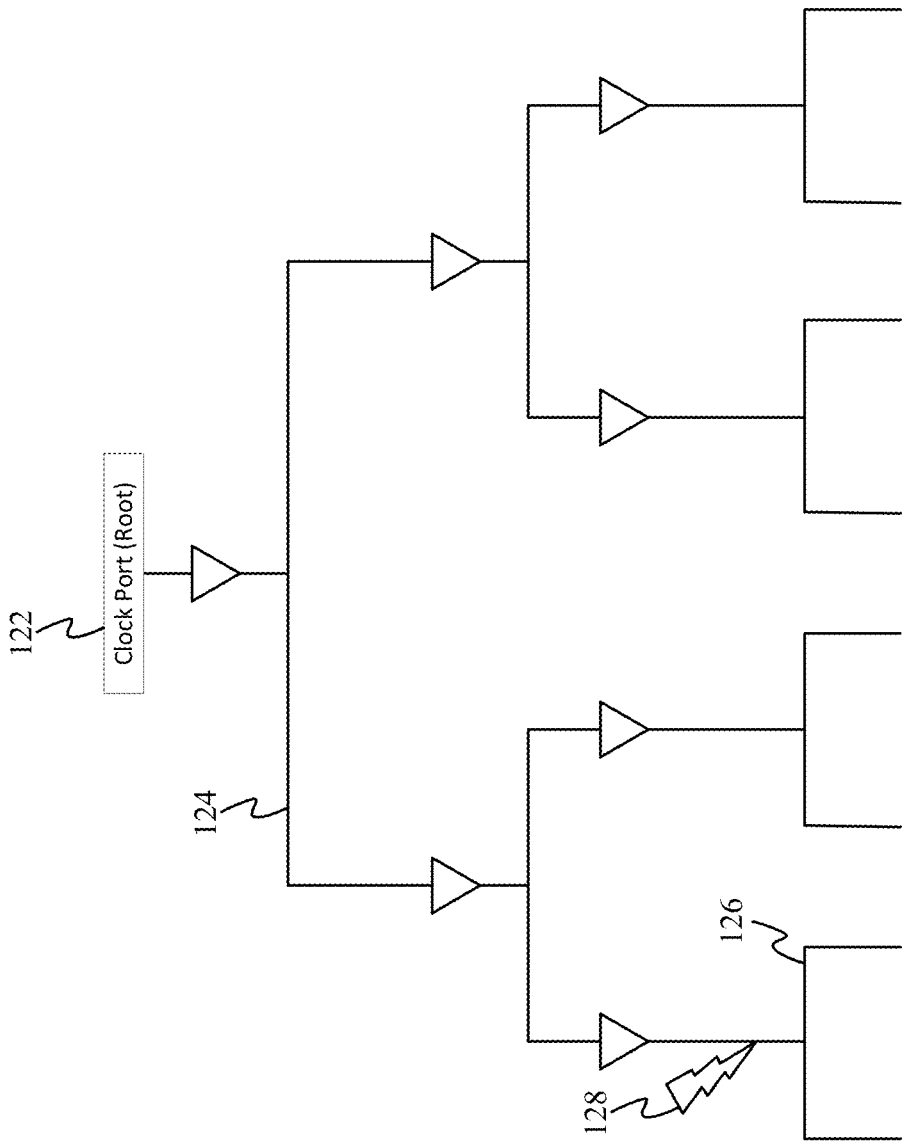
FIG. 1B illustrates an example clock tree distribution network.

FIG. 1A illustrates an example reset tree distribution network. As illustrated in FIG. 1A, a Reset signal can be cascaded to synchronize across a system to ensure consistency. This can be done to properly reset a system without leaving some system components in an old state. FIG. 1B illustrates an example clock tree distribution network. As illustrated in FIG. 1B, a clock signal can be cascaded to synchronize a system. This can be done to ensure the connected system components perform actions simultaneously. In both the reset tree and the clock tree examples, a change in one or more terminal node could cause errors in the system, so a form of detection that can initiate an alarm can be beneficial.

Referring to FIG. 1A, a system can use a tree structure to cascade a Reset signal. A single source of a reset signal (e.g. a reset port 102) can be distributed in a branching fashion, using buffers to prevent signal conflicts. The signal from the Reset port 102 can pass through a buffer and then lead to multiple branches 104. A signal after the buffer can again lead to multiple branches. The signal can continue to branch until a terminal node 106 is reached, at which point the signal reaches a component that takes the reset signal as an input. In some cases, the reset signal can be held in a capture component 108 (e.g. a flip flop). An injected fault 110 may affect a node, for example, node 106 by electrically changing a value of the reset signal at one or more branch of the tree. This change can cause issues with performance of the system. Aside from experiencing issues such as downtime, the component may boot into a default state that may include an unsecure mode (e.g. if a part is repurposed from a non-security application) and expose the system to a more damaging attack after the reset signal is processed. Another possible outcome may be that the reset event remains unrecognized at node 106, leaving node 106 at an insecure state which the reset of the system performs a secure reset of the full system, therefore, potentially compromising the information and state of all logic following node 106.

Referring to FIG. 1B, a system can use a tree structure to cascade a clock signal. A single source of a clock signal (e.g. a clock port 122) can be distributed in a branching fashion, using buffers to prevent signal conflicts. The signal from the clock port 122 can pass through a buffer and then lead to multiple branches 124. A signal after the buffer can again lead to multiple branches. The signal can continue to branch until a terminal node 126 is reached, at which point the signal reaches a component that takes the clock signal as an input. An injected fault 128 may occur that electrically changes a value of the clock signal at one or more branch of the tree, possibly the terminal node 126. This change can cause issues with performance of the system and may expose information that should otherwise remain secure. Similarly, another possible outcome may be that the clock event remains unrecognized at node 126, leaving node 126 at an insecure state, potentially compromising the information and state of all logic following node 126.

Figure 2A:
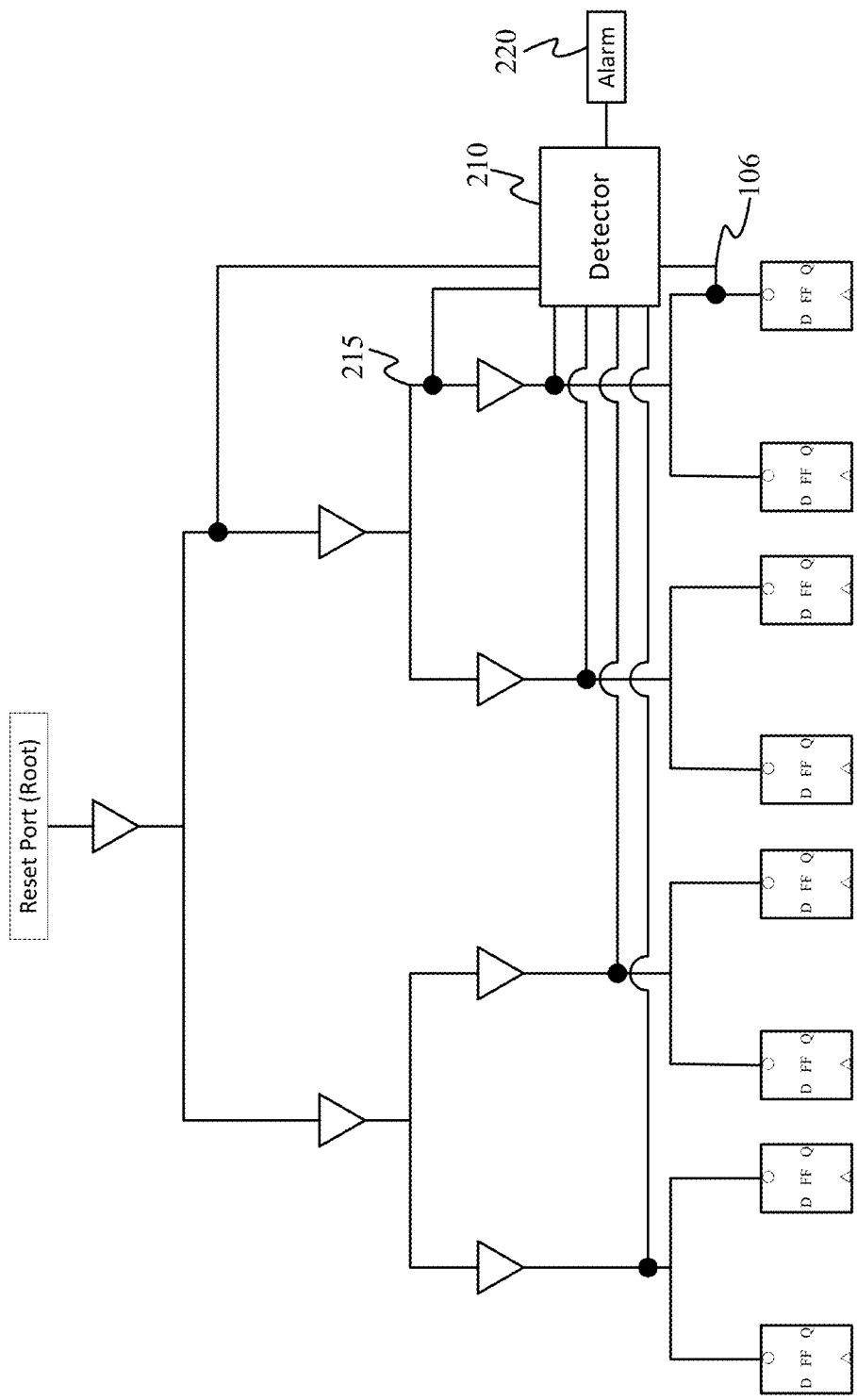
FIG. 2A illustrates an example reset tree distribution network with security measure.

FIG. 2A illustrates an example reset tree distribution network with security measure. Referring to FIG. 2A, circuitry to implement the hardware countermeasure can be added to a reset tree such as shown in FIG. 1A to secure the tree. The circuitry can include a detector 210 coupled to two or more nodes of the tree structure (e.g., for a reset signal) to detect differences between values of a signal (e.g., the reset signal) at two or more nodes. The nodes compared can include one or more terminal nodes 106 and/or one or more lines 215. The nodes or lines being compared can be symmetric (e.g., at a same depth from the root of the tree or before/after a particular component that is on each branch) or can be placed at any position on the tree. In some cases, the detector 210 is coupled to each terminal node 106 of the tree structure.

Figure 3A:
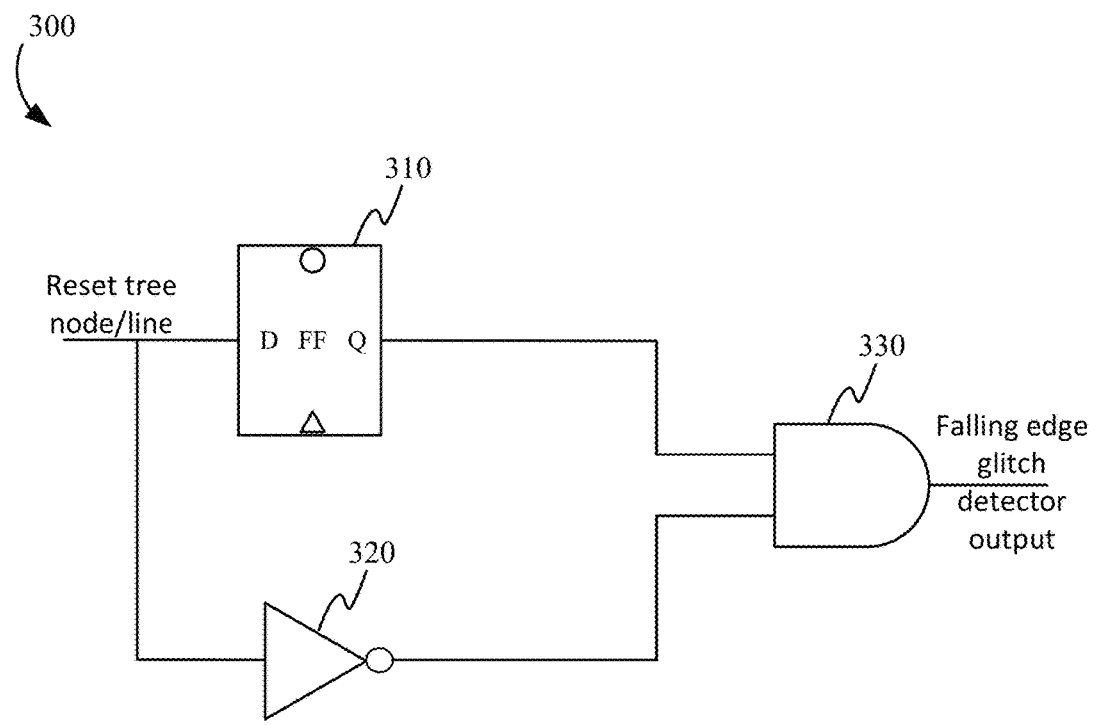
FIGS. 3A and 3B show example glitch detectors that may be included as part of a detector for a reset tree distribution network.
Figure 3B:
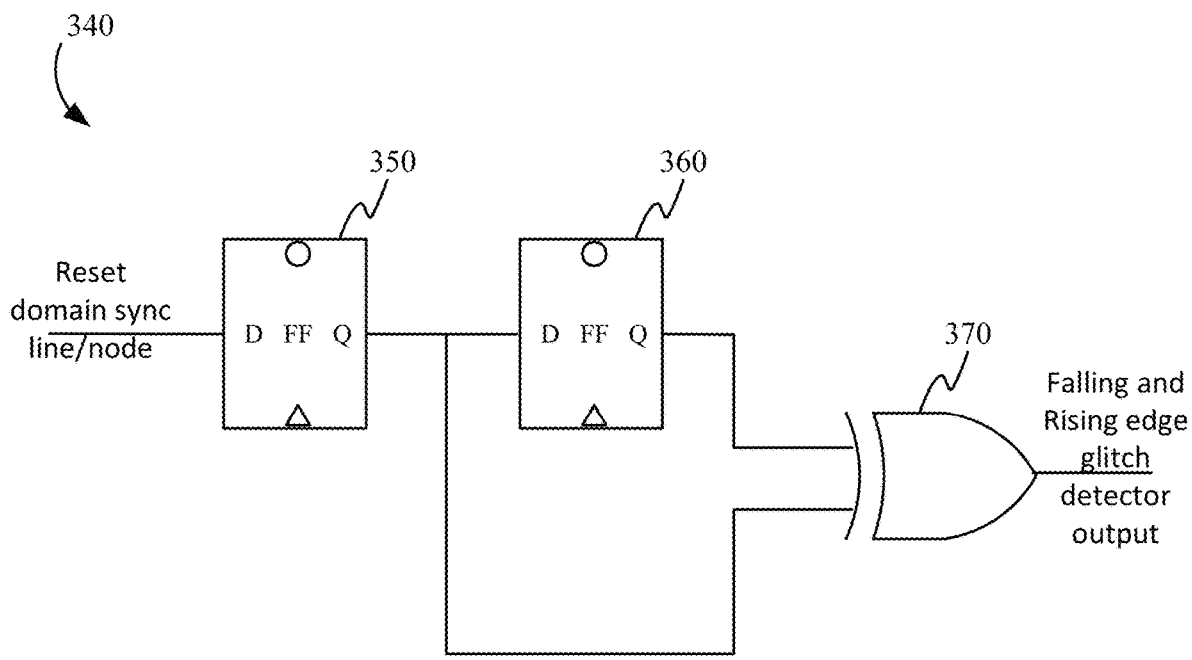

In some cases, the detector 210 is or includes a comparator. In some cases, the detector 210 can include one or more falling edge glitch detectors, such as shown in FIG. 3A, and a comparator that compares the output of the falling edge glitch detectors. FIGS. 3A and 3B show example glitch detectors that may be included as part of a detector for a reset tree distribution network.

Referring to FIG. 3A, the illustrated glitch detector 300 may be provided in plurality and be coupled to a corresponding node or line of the nodes and/or lines coupled to the detector 210. Glitch detector 300 can include a flip flop 310, an inverter 320, and an AND gate 330. The flip flop 310 and the inverter 320 both receive the signal from the node or line and provide an output to the AND gate 330. The output of the AND gate 330 provides the falling edge glitch detector output to, for example a comparator of detector 210. In some cases, a reset tree distribution network may include a plurality of reset domains. A detector coupled to a reset domain in a high level in the tree distribution network may be implemented using a glitch detector such as illustrated in FIG. 3B. In some of such cases, the detector coupled to the lower level in the tree distribution network can be implemented using a glitch detector such as illustrated in FIG. 3A (and operate at a current clock, while the high level detector operates with a reset synchronizer). Referring to FIG. 3B, glitch detector 340 can include a first flip flop 350, a second flip flop 360, and an XOR gate 370. The first flip flop 350 can receive a signal from, for example, a reset synchronizer of a reset domain in the high level of the tree distribution network, and can provide an output to the second flip flop 360 and the XOR gate 370. The second flip flop 360 also provides an output to the XOR gate 370. XOR gate 370 provides a falling and rising edge detector output to, for example, an internal detector.

Returning to FIG. 2A, the circuitry implementing the hardware countermeasure can also include an alarm circuit 220 coupled to receive an output of the detector 210. The alarm circuit 220 can initiate an alarm in response to a signal from the detector 210 indicating that a difference between the values of the signal detected by the detector 210 satisfy an error condition. The error condition can include, but is not limited to, where the difference is above a certain threshold or where the difference is below a certain threshold. A security action can be initiated by the alarm circuit 220.

Logic devices such as AND or OR gates can be used in conjunction with the detector 210 to compare multiple nodes if the number of nodes is larger than the number of inputs to the comparator. In some cases, multiple detectors are used to capture signals from groups of lines and/or nodes of the tree structure.

Figure 2B:
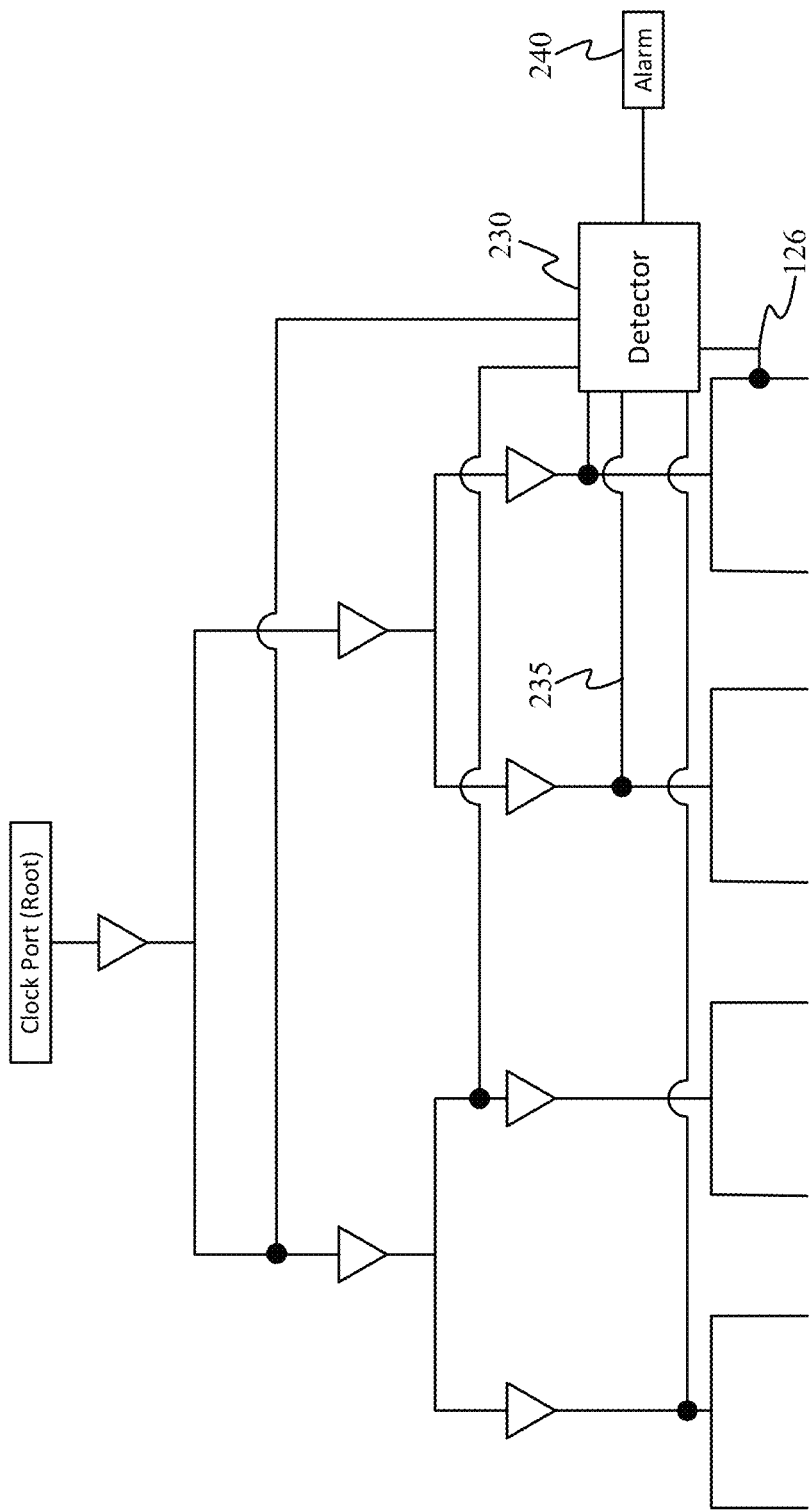
FIG. 2B illustrates an example clock tree distribution network with security measure.

FIG. 2B illustrates an example clock tree distribution network with security measure. Referring to FIG. 2B, circuitry to implement the hardware countermeasure can be added to a clock tree such as shown in FIG. 1B to secure the tree. The circuitry can include a detector 230 coupled to two or more nodes of the tree structure (e.g., for a clock signal) to detect differences between values of a signal (e.g., the clock signal) at two or more nodes. The nodes compared can include one or more terminal nodes 126 and/or one or more lines 235. The nodes or lines being compared can be symmetric (e.g., at a same depth from the root of the tree or before/after a particular component that is on each branch) or can be placed at any position on the tree. In some cases, the detector can be coupled to each terminal node 126 of the tree structure. The detector 230 can be a phase detector. The circuitry can also include an alarm circuit 240 coupled to receive an output of the detector 230. The alarm circuit 240 can initiate an alarm in response to a signal from the detector 230 indicating that a difference between the values (e.g., phase, voltage, frequency, etc.) of the signal detected by the detector 230 satisfy an error condition. The error condition can include, but is not limited to, where the difference is above a certain threshold or where the difference is below a certain threshold. A security action can be initiated by the alarm circuit 240.

Logic devices such as AND or OR gates can be used in conjunction with the detector 230 to compare multiple nodes if the number of nodes is larger than the number of inputs to the comparator or phase detector or detector 230. In some cases, multiple detectors are used to capture signals from groups of lines and/or nodes of the tree structure.

Figure 4A:
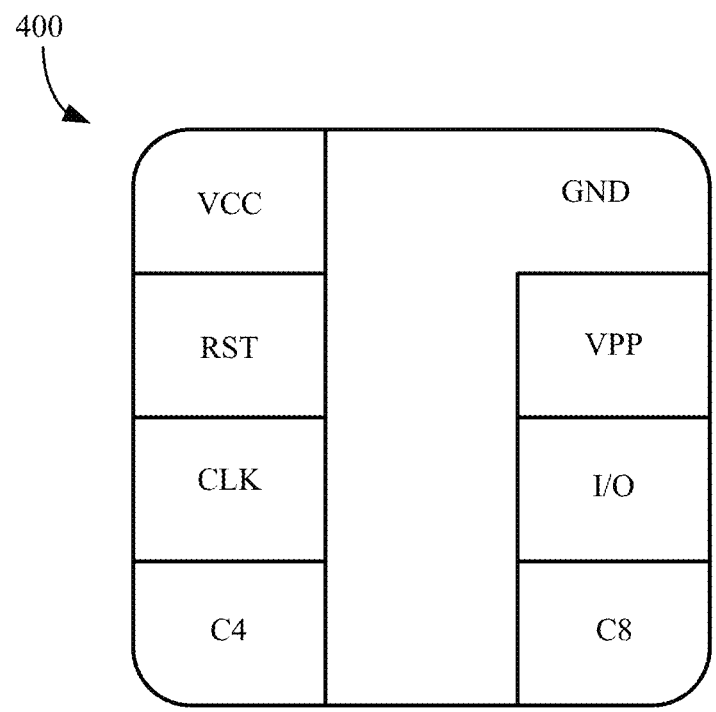
FIG. 4A shows an illustrative smart card pinout for a smart card chip that can include the described security measures for signal paths with tree structures.
Figure 4B:
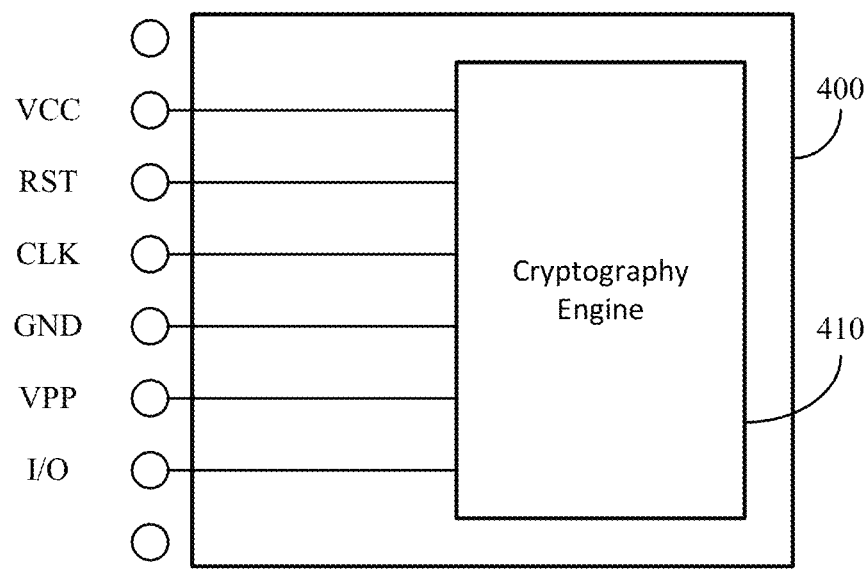
FIG. 4B provides a representational diagram of the smart card of FIG. 4A.

FIG. 4A shows an illustrative smart card pinout for a smart card chip that can include the described security measures for signal paths with tree structures; and FIG. 4B provides a representational diagram of the smart card of FIG. 4A. A smart card chip 400 includes circuitry and packaging. Smart cards are portable, personal security computing devices that can securely carry sensitive information, enable secure transactions, validate an individual's identity within a secure system, and verify that an information requestor is authorized to access the information carried on the card. Smart cards are configured to maintain the integrity of the information stored on the card, as well as make the information available for secure interactions with an overall system.

Presently, standard smart card chip packaging provides a 6 pin or 8 pin bus pinout. As shown in FIG. 4A, packaging for a smart card chip 400 can include pads for VCC (power supply input), RST (a reset signal input, which can be used by itself or in combination with an internal reset control circuit), CLK (clocking or timing signal), GND (ground—a ground or VSS signal), VPP (programming voltage input), and I/O (input or output for serial data to the microcontroller inside the smart card). Two additional connection pads (e.g., C4 and C8) can be included for application specific inputs (or outputs) or future standards. The pads are coupled to the smart card chip circuitry, including a cryptographic engine block 410. Although only a cryptographic engine block 410 is illustrated in FIG. 4B, a smart card chip 400 can include a plurality of different circuit blocks and sub-blocks, including, but not limited to, a processor, memory, analog circuitry, and interface circuitry, in addition to the cryptographic engine block 410. Furthermore, any one or combination of countermeasures including the hardware countermeasure described herein can be included as part of smart card chip 400.

The smart card 400 can include a reset tree structure and/or a clock tree structure, such as described with respect to FIGS. 1A and 1B. When the hardware countermeasure is applied to the reset tree structure, the hardware countermeasure can include a first detector coupled to two or more nodes of the reset tree structure to detect differences between values of a reset signal at the two or more nodes of the reset tree structure (see e.g., FIG. 2A). When the hardware countermeasure is applied to the clock tree structure, the hardware countermeasure can include a second detector coupled to two or more nodes of the clock tree structure to detect differences between values of a clock signal at the two or more nodes of the clock tree structure (see e.g., FIG. 2B). One or more alarm circuits can be provided to initiate an alarm when an error condition is detected using the first and/or second detector.

The physical design stage of an integrated circuit design process generally includes logic synthesis, floor planning, power planning, placement, clock tree synthesis, routing, verification, and "tapeout" (export of data in form for manufacturing). These stages may be carried out using associated tools that may individually or together form an EDA tool. For example, in one EDA tool with automatic place and route (APR) software, a gate-level netlist, which may be obtained from a logic synthesis tool (as part of the logic synthesis stage), is physically implemented in a layout by placing standard-cell layout (placement stage) and then auto-routing cells (routing stage) based on the connections inferred from the netlist. Where the APR software is separate from that used in the subsequent stages, the routed design can be exported from the APR tool in a format that can be understood by post analysis tools such as extraction or power analysis tools. The described EDA tool with security feature functionality can be used for the physical design stage of an integrated circuit design process.

Figure 5A:
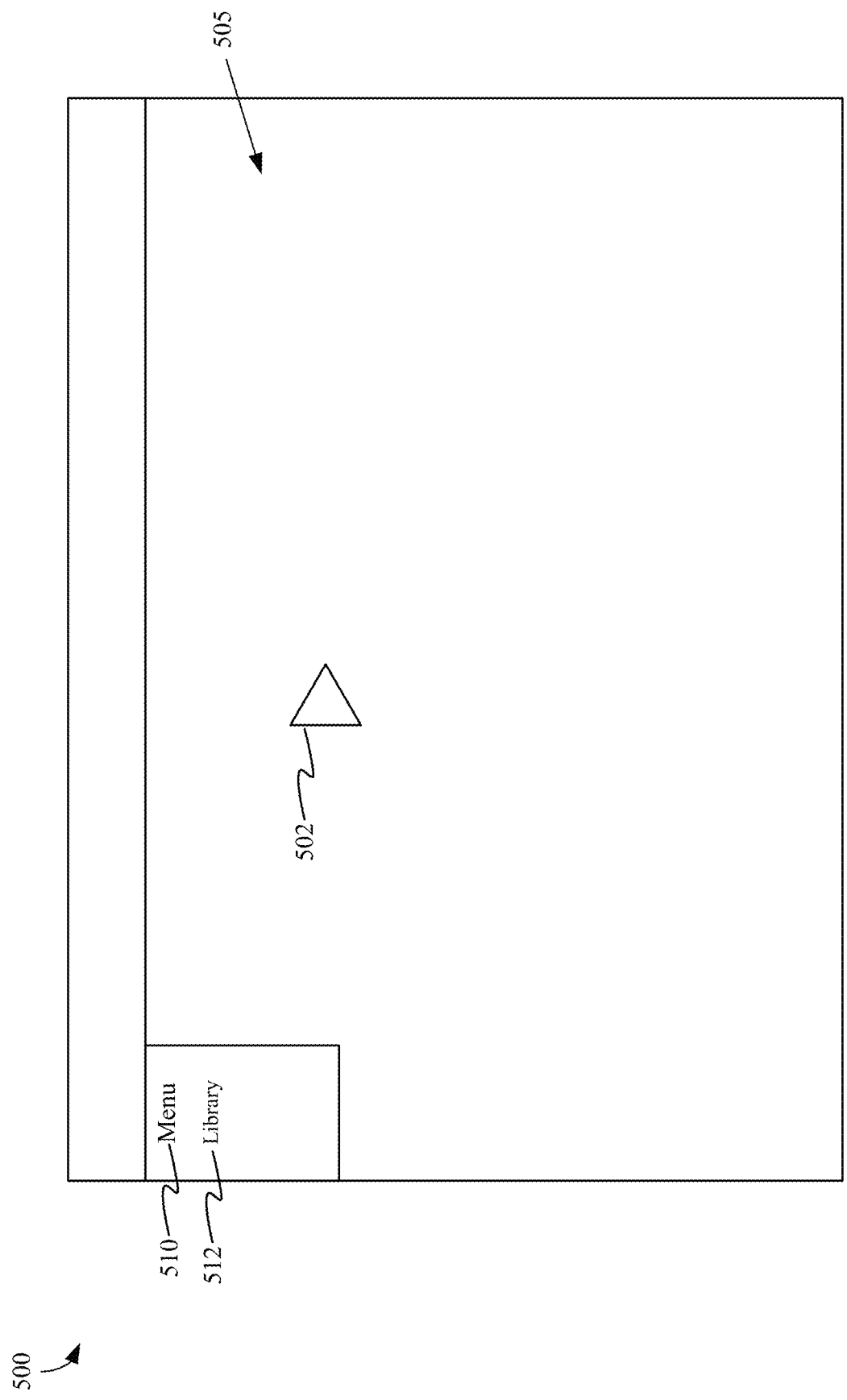
FIGS. 5A-5C illustrate representative screen shots of an example scenario for an electronic design automation (EDA) tool with security feature functionality.
Figure 5B:
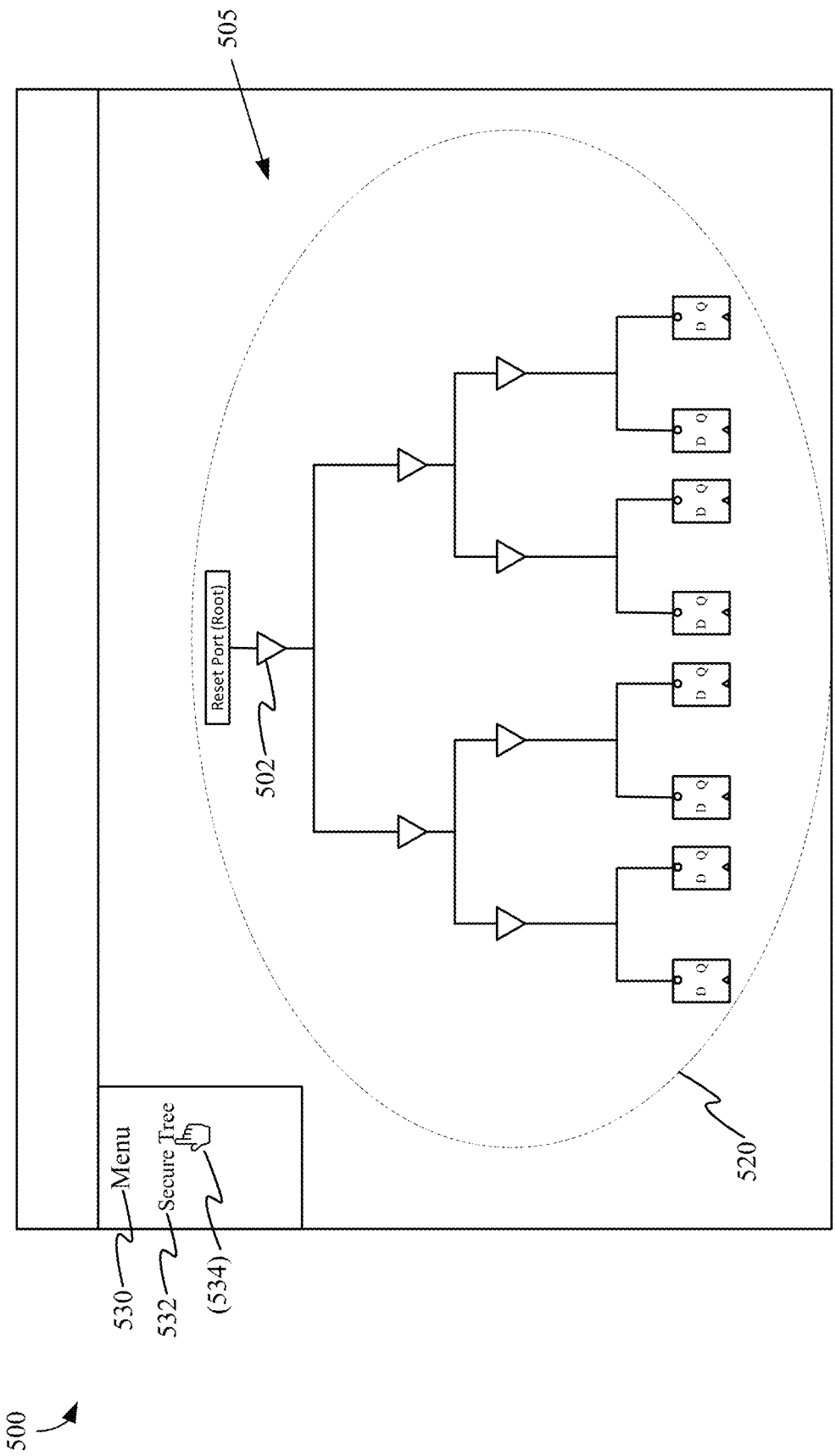
Figure 5C:
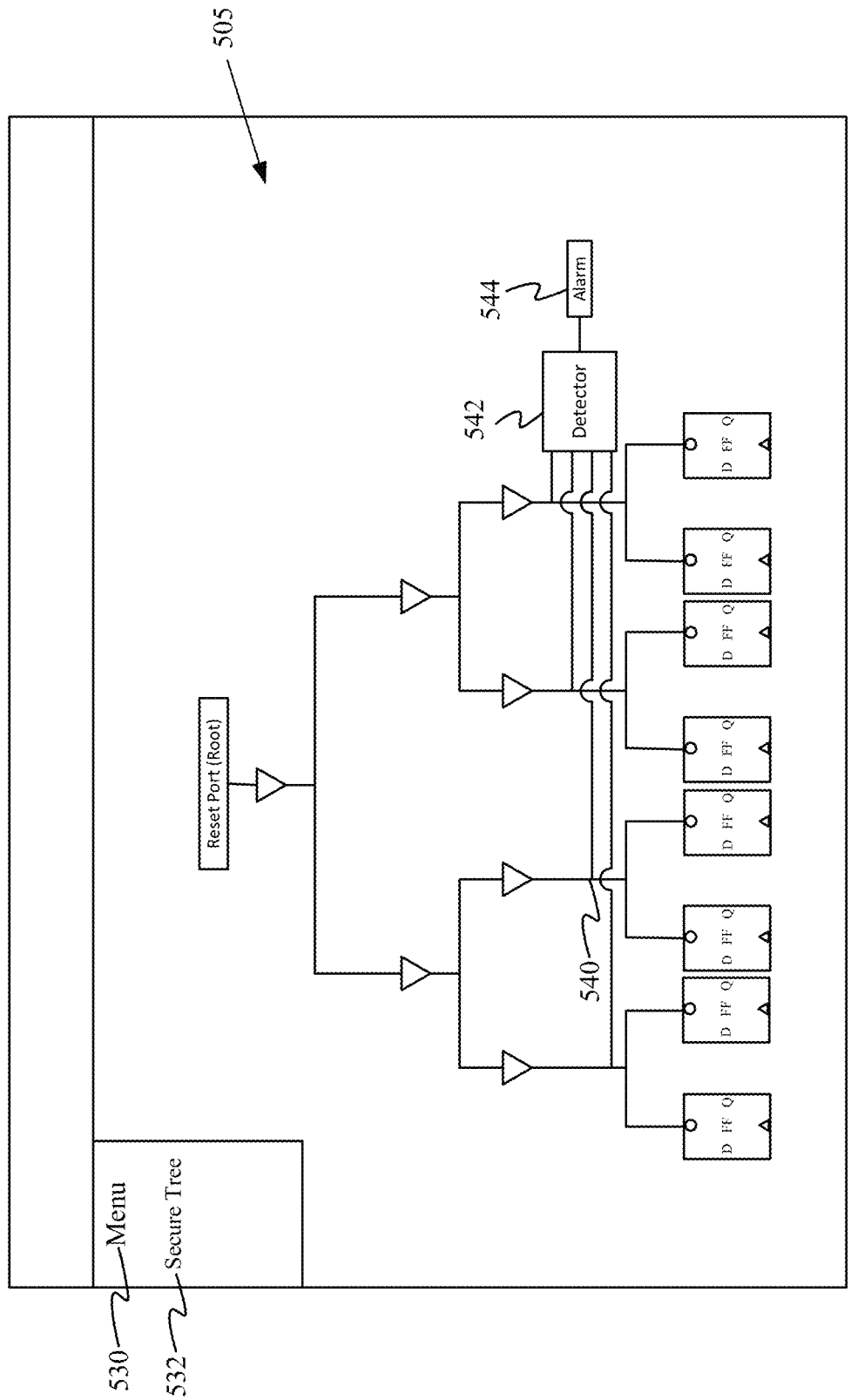

FIGS. 5A-5C illustrate representative screen shots of an example scenario for an EDA tool with security feature functionality. Referring to FIG. 5A, a graphical user interface (GUI) 500 of an EDA tool can include a canvas 505 upon which a circuit or schematic is displayed and created. The circuit can be composed of various individual components and wires. A menu 510 of commands can be provided. The commands can include options to add components from a library to the canvas and an option to secure a tree. It should be understood that the menu may be in the form of a toolbar, context menu, panel, or other GUI element that enables a user to view and select one or more commands. Further, although the menu is described singularly, the menu may be a nested menu and/or provided with different options depending on context. Using menu 510, a user can select a Library option 512 to select components to add to the canvas 505. For example, a component 502 can be added to the canvas 505 to begin designing a circuit. Components can be added and removed from the canvas 505, as well as manipulated to adjust for location, size, and any other characteristics. In some cases, a netlist can be generated based on the arrangement of components on the canvas. In some cases, the EDA tool enables importing of an existing netlist and automated layout of the components onto the canvas.

Referring to FIG. 5B, the GUI 500 can include an option to secure a tree. The option to secure a tree can automatically add circuitry for a hardware countermeasure. When a user selects the Secure Tree option 532, the EDA tool can identify a tree structure, such as tree structure 520, from components on the canvas (or from a netlist corresponding to a circuit's design) and add the hardware countermeasure coupled to at least two lines or terminal nodes of the tree structure. The Secure Tree option 532 may be available from menu 530, which as described with respect to menu 510, can be in the form of a toolbar, context menu, panel, or other GUI element that enables a user to view and select one or more commands. In some cases, where there are more than one tree structures in the design, the EDA tool can enable a user to select which one or ones of the three structures to apply the hardware countermeasure.

Referring to FIG. 5C, the hardware countermeasures to secure the tree can be automatically added to the EDA file as a result of the selection. A routine to add the circuitry to secure the tree 520 can be contained within the EDA program or the routine can be performed or hosted on an outside service. The hardware countermeasure can include detector 542 coupled to two or more nodes of the tree structure 520 to detect differences between values of a signal at the two or more nodes. The hardware countermeasure can also include an alarm circuit 544 coupled to receive an output of the detector 542. The circuitry can be added automatically via APR software, but the routine can also include manual components, such as manual routing or component selection. If performed purely automatically, there can be some default rule that governs routing and component selection. The default rule can be modified before runtime of the routine.

Accordingly, one or more computer-readable storage media having instructions stored thereon for an EDA tool can be provided that, when executed by a computing system, direct the computing system to: display a canvas through which components of a circuit are arranged; provide at least one menu of commands, including an option to add components from a library to the canvas and an option to secure a tree; provide options for manipulation of components on the canvas; and in response to receiving a selection of the option to secure the tree: identify a tree structure from components on the canvas or from a netlist corresponding to a circuit's design; and add a hardware countermeasure coupled to at least two lines or terminal nodes of the tree structure. The EDA tool can further provide options for analysis tools; and provide options to import netlists, including the netlist corresponding to the circuit's design.

The hardware countermeasure can include a detector and an alarm circuit. In some cases, the detector includes a comparator. In some cases, the detector includes a phase detector.

In some cases, the instructions to add the hardware countermeasure coupled to at least two lines or terminal nodes of the tree structure direct the computing system to: add the hardware countermeasure to the components on the canvas or to the netlist; and indicate an interconnect between the hardware countermeasure and each of the at least two lines or terminal nodes.

In some cases, the hardware countermeasure is coupled to each terminal node of the tree structure.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. One or more non-transitory computer-readable storage media having instructions stored thereon for an Electronic Design Automation tool that, when executed by a computing system, direct the computing system to:
   display a canvas through which components of a circuit are arranged;
   provide at least one menu of commands, including an option to add components from a library to the canvas and an option to secure a tree;
   provide options for manipulation of components on the canvas; and
   in response to receiving a selection of the option to secure the tree:
      identify, by the computing system, a tree structure from components on the canvas or from a netlist corresponding to a circuit's design; and
      add, by the computing system, a hardware countermeasure coupled to at least two lines or terminal nodes of the tree structure.

2. The one or more computer-readable storage media of claim 1, wherein the instructions to add the hardware countermeasure coupled to at least two lines or terminal nodes of the tree structure direct the computing system to:
   add the hardware countermeasure to the components on the canvas or to the netlist; and
   indicate an interconnect between the hardware countermeasure and each of the at least two lines or terminal nodes.

3. The one or more computer-readable storage media of claim 1, wherein the hardware countermeasure is coupled to each terminal node of the tree structure.

4. The one or more computer-readable storage media of claim 1, wherein the hardware countermeasure comprises a detector and an alarm circuit.

5. The one or more computer-readable storage media of claim 4, wherein the detector comprises a comparator.

6. The one or more computer-readable storage media of claim 4, wherein the detector comprises a phase detector.

7. The one or more computer-readable storage media of claim 1, wherein the tree structure is a clock tree.

8. The one or more computer-readable storage media of claim 1, wherein the tree structure is a reset tree.

9. The one or more computer-readable storage media of claim 1, further comprising instructions that, when executed by the computing system, direct the computing system to:
   provide options for analysis tools; and
   provide options to import netlists, including the netlist corresponding to the circuit's design.

\* \* \* \* \*